US012664957B2

(12) United States Patent
Sugino et al.

(10) Patent No.: US 12,664,957 B2

(45) Date of Patent: Jun. 23, 2026

(54) SCANNING SIGNAL LINE DRIVE CIRCUIT AND DISPLAY DEVICE PROVIDED WITH SAME

(71) Applicant: Sharp Display Technology Corporation, Kameyama City (JP)

(72) Inventors: Masafumi Sugino, Kameyama City (JP); Tohru Daitoh, Kameyama City (JP); Hajime Imai, Kameyama City (JP); Tatsuya Kawasaki, Kameyama City (JP); Yohei Takeuchi, Kameyama City (JP); Kengo Hara, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 0 days.

(21) Appl. No.: 19/184,552

(22) Filed: Apr. 21, 2025

(65) Prior Publication Data

US 2025/0384854 A1 Dec. 18, 2025

(30) Foreign Application Priority Data

Jun. 17, 2024 (JP) ................................. 2024-097309

(51) Int. Cl.
*G09G 3/36* (2006.01)

(52) U.S. Cl.
CPC ... *G09G 3/3677* (2013.01); *G09G 2300/0819* (2013.01); *G09G 2310/0286* (2013.01); *G09G 2310/061* (2013.01); *G09G 2320/045* (2013.01)

(58) Field of Classification Search
CPC ......... G09G 3/3677; G09G 2300/0819; G09G 2310/0286; G09G 2310/061; G09G 2320/045
See application file for complete search history.

(56) References Cited

U.S. PATENT DOCUMENTS

2010/0201659 A1 8/2010 Miyake et al.

FOREIGN PATENT DOCUMENTS

JP 2019-113863 A 7/2019

*Primary Examiner* — Towfiq Elahi

(74) *Attorney, Agent, or Firm* — ScienBiziP, P.C.

(57) ABSTRACT

In a unit circuit constituting a shift register, as a constituent element for changing the potential of a node (first control node) connected to the gate terminal of an output control transistor from a high level to a low level, two thin film transistors (a first reset transistor and a second reset transistor) connected in series between the first control node and an input terminal for a low-level DC power supply voltage VSS are provided. A capacitor is provided between the drain terminal and the source terminal of each of the two thin film transistors.

8 Claims, 19 Drawing Sheets

SCANNING SIGNAL LINE DRIVE CIRCUIT AND DISPLAY DEVICE PROVIDED WITH SAME

CROSS-REFERENCE TO RELATED APPLICATIONS

This application claims the benefit of priority to Japanese Patent Application Number 2024-097309 filed on Jun. 17, 2024. The entire contents of the above-identified application are hereby incorporated by reference.

BACKGROUND

Technical Field

The following disclosure relates to a display device and more particularly relates to a scanning signal line drive circuit for driving scanning signal lines disposed on a display portion of the display device.

A liquid crystal display device that includes a display portion including a plurality of source bus lines (image signal lines) and a plurality of gate bus lines (scanning signal lines) has been known. In such a liquid crystal display device, a pixel forming section that forms a pixel is provided at each of intersections of the source bus lines and the gate bus lines. Each of the pixel forming sections includes a thin film transistor that includes a switching element with a gate terminal connected to a gate bus line routed through the corresponding intersection and a source terminal connected to a source bus line routed through the intersection, and a pixel capacitance configured to hold a pixel voltage value, and the like. The liquid crystal display device also includes a gate driver (a scanning signal line drive circuit) for driving the gate bus lines and a source driver (an image signal line drive circuit) for driving the source bus lines.

An image signal indicating the pixel voltage value is transmitted through the source bus lines. However, each of the source bus lines cannot transmit image signals indicating the pixel voltage values for a plurality of rows at one time (at the same time). Thus, the image signals are sequentially written (charged) into the pixel capacitances in the plurality of pixel forming sections provided in the display portion on a row-by-row basis. In order to achieve this writing scheme, the gate driver is constituted by a shift register including a plurality of stages so as to sequentially select the plurality of gate bus lines for a predetermined period each time. Then, active scanning signals are sequentially output from the plurality of stages to cause the image signals to be sequentially written into the pixel capacitances on the row-by-row basis as described above. Note that, in the present specification, a circuit constituting each of stages of the above shift register is referred to as a "unit circuit".

Incidentally, the gate driver has been mounted as an integrated circuit (IC) chip on a peripheral portion of a substrate constituting a liquid crystal panel in many cases. However, in recent years, the gate driver is formed directly on the substrate in many cases. Such a gate driver is referred to as a "monolithic gate driver".

FIG. 17 is a circuit diagram illustrating a configuration example of a known unit circuit included in a shift register constituting a monolithic gate driver. The unit circuit includes three thin film transistors (a set transistor T91, a reset transistor T92, and an output control transistor T93), and one capacitor (capacitance element) C9. The unit circuit includes three input terminals 91 to 93 and one output terminal 99, in addition to an input terminal for a low-level DC power supply voltage VSS. An output signal from a unit circuit constituting a preceding stage is supplied to the input terminal 91 as a set signal S, an output signal from a unit circuit constituting a subsequent stage is supplied to the input terminal 92 as a reset signal R, and one of a plurality of clock signals for causing the shift register to operate is supplied to the input terminal 93 as an input clock signal CLKin. An output signal Q serving as a scanning signal is output from the output terminal 99. Note that an internal node connected to the gate terminal of the output control transistor T93 is referred to as a "control node", and the control node is denoted by a sign NA.

Ideal operations of the unit circuit illustrated in FIG. 17 will be described with reference to FIG. 18. During the period before time t91, the potential of a control node NA and the potential of the output signal Q (the potential of the output terminal 99) are at a low level.

At the time t91, the set signal S changes from the low level (off level) to a high level (on level). Since the set transistor T91 is diode-connected as illustrated in FIG. 17, due to the set signal S changing to the high level, the set transistor T91 goes into an on state, and the potential of the control node NA changes from the low level to the high level. As such, the output control transistor T93 goes into the on state. Here, during the period from the time t91 to time t92, the input clock signal CLKin is maintained at the low level. Due to this, during this period, the output signal Q is maintained at the low level.

At the time t92, the input clock signal CLKin changes from the low level to the high level. At this time, since the output control transistor T93 is in the on state, the potential of the output terminal 99 increases along with an increase in the potential of the input terminal 93. Here, since the capacitor C9 is provided between the control node NA and the output terminal 99 as illustrated in FIG. 17, the potential of the control node NA also increases as the potential of the output terminal 99 increases (the control node NA is set to a boost state). As a result, a large voltage is applied to the gate terminal of the output control transistor T93, and the potential of the output signal Q increases up to a level sufficient to cause the gate bus line connected to the output terminal 99 to be in a select state.

At time t93, the input clock signal CLKin changes from the high level to the low level. Thus, the potential of the output terminal 99 decreases along with a decrease in the potential of the input terminal 93. That is, the potential of the output signal Q is set to be at the low level. The potential of the control node NA also decreases via the capacitor C9.

At time t94, the reset signal R changes from the low level to the high level. Thus, the reset transistor T92 goes into the on state. As a result, the potential of the control node NA changes from the high level to the low level.

Due to the above-described operation being performed in all the unit circuits constituting the shift register, a plurality of gate bus lines are sequentially brought into the select state for each predetermined period. As such, the image signals are sequentially written (charged) into the pixel capacitances in the plurality of pixel forming sections provided in the display portion on a row-by-row basis.

Note that in connection with the disclosure, JP 2019-113863 A discloses a technique for suppressing deterioration of characteristics of a thin film transistor in a gate driver.

SUMMARY

In a display device such as a liquid crystal display device including a monolithic gate driver, characteristics of a thin film transistor included in the monolithic gate driver may deteriorate due to voltage stress or the like. In particular, when the voltage of the monolithic gate driver is increased for high frequency drive, due to an increase in the voltage stress applied to the thin film transistor, deterioration called "hot carrier degradation" may occur in the thin film transistor to cause a display defect. Note that hot carrier degradation is a phenomenon in which high-energy carriers accelerated by a high electrical field in a thin film transistor are injected into a gate oxide film to cause a change in characteristics of the thin film transistor.

The hot carrier degradation of the thin film transistor in a known unit circuit (see FIG. 17) constituting the monolithic gate driver will be described with reference to FIG. 19. FIG. 19 illustrates changes in a gate-source voltage Vgs and a drain-source voltage Vds of the reset transistor T92 in a period near the time t94 (a period before and after the reset transistor T92 changes from an off state to the on state) in the above-described operation (see FIG. 18) of the unit circuit. Note that in FIG. 19, a thick solid line indicates a change in the gate-source voltage Vgs, and a thick dotted line indicates a change in the drain-source voltage Vds.

As for the reset transistor T92, the reset signal R is applied to the gate terminal, a drain terminal is connected to the control node NA, and the low-level DC power supply voltage VSS is applied to the source terminal. The potential of the control node NA connected to the drain terminal of the reset transistor T92 is at the high level immediately before the reset signal R changes from the low level to the high level (that is, immediately before the time t94 in FIG. 18). That is, immediately before the reset signal R changes from the low level to the high level, the drain potential of the reset transistor T92 has a high value. Also, the low-level DC power supply voltage VSS is applied to the source terminal of the reset transistor T92. As described above, as illustrated in FIG. 19, the drain-source voltage Vds has a large value at the time when the gate-source voltage Vgs has a value near a threshold voltage Vth of the reset transistor T92 in the process in which the reset signal R changes from the low level to the high level. As a result, a strong voltage stress is applied to the reset transistor T92, and the above-described hot carrier degradation occurs in the reset transistor T92. When such hot carrier degradation occurs, discharge of the control node NA is not appropriately performed, and a display defect may be caused. In recent years, since a drive voltage tends to increase due to an increase in the size and frequency of a display panel such as a liquid crystal panel, it is important to cope with such a problem caused by hot carrier degradation.

Note that JP 2019-113863 A describes a configuration for suppressing deterioration of a thin film transistor used for charging an internal node in each unit circuit (pulse output circuit) constituting a shift register, but does not describe a configuration for suppressing hot carrier degradation of a thin film transistor corresponding to the reset transistor T92.

Therefore, an object of the following disclosure is to achieve a gate driver (scanning signal line drive circuit) capable of suppressing occurrence of a display defect caused by hot carrier degradation of a transistor (typically, a thin film transistor).

(1) A scanning signal line drive circuit according to some embodiments of the disclosure is a scanning signal line drive circuit configured to drive a plurality of scanning signal lines disposed in a display portion of a display device, the scanning signal line drive circuit including:

a shift register including a plurality of unit circuits constituting a plurality of stages and respectively corresponding to the plurality of scanning signal lines, the shift register operating based on a plurality of clock signals cyclically corresponding to the plurality of unit circuits, in which each of the plurality of unit circuits includes a first control node, a second control node, an output node connected to a corresponding scanning signal line, an output control transistor including a control terminal connected to the first control node, a first conduction terminal to which an input clock signal, which is one of the plurality of clock signals, is supplied, and a second conduction terminal connected to the output node, a set transistor including a control terminal to which a set signal is supplied, the set signal being an output signal output from a unit circuit of a z-th stage before a current stage, where z is a natural number, a first conduction terminal to which the set signal or an on level potential is supplied, and a second conduction terminal connected to the first control node, a first reset transistor including a control terminal to which a first reset signal is supplied, the first reset signal being an output signal output from a unit circuit of an x-th stage after the current stage, where x is a natural number, a first conduction terminal connected to the first control node, and a second conduction terminal connected to the second control node, a second reset transistor including a control terminal to which a second reset signal is supplied, the second reset signal being an output signal output from a unit circuit of a y-th stage after the current stage, where y is a natural number greater than the x, a first conduction terminal connected to the second control node, and a second conduction terminal to which an off level potential is supplied, a first adjustment capacitor having one end connected to the first control node and the other end connected to the second control node, and a second adjustment capacitor having one end connected to the second control node and the other end to which an off level potential is supplied, and after the first reset transistor changes from an off state to an on state based on the first reset signal in order to change a potential of the first control node from an on level to an off level, the second reset transistor changes from an off state to an on state based on the second reset signal before the first reset transistor changes from the on state to the off state based on the first reset signal.

(2) The scanning signal line drive circuit according to some embodiments of the disclosure includes the configuration of (1), in which a relationship between the z, a number P of phases of the plurality of clock signals, and a duty ratio D of each of the plurality of clock signals satisfies the following expression, $$z/P \leq 1-D.$$

(3) The scanning signal line drive circuit according to some embodiments of the disclosure includes the configuration of (1), in which a relationship between the x, the y, the number P of phases of the plurality of clock signals, and the duty ratio D of each of the plurality of clock signals satisfies the following four expressions, $$x/P>D$$

$$y/P<1$$

$$y>x$$

$$(y-x)/P<D.$$

(4) The scanning signal line drive circuit according to some embodiments of the disclosure includes the configuration of (1), in which a relationship between the z, the x, the y, the number P of phases of the plurality of clock signals, and the duty ratio D of each of the plurality of clock signals satisfies the following five expressions, $$z/P\leq 1-D$$

$$x/P>D$$

$$y/P<1$$

$$y>x$$

$$(y-x)/P<D.$$

(5) The scanning signal line drive circuit according to some embodiments of the disclosure includes the configuration of (1), in which each of the plurality of unit circuits further includes a boost capacitor having one end connected to the first control node and the other end connected to the output node.

(6) The scanning signal line drive circuit according to some embodiments of the disclosure includes the configuration of (1), in which the first reset transistor and the second reset transistor are thin film transistors.

(7) The scanning signal line drive circuit according to some embodiments of the disclosure includes the configuration of (6), in which the first reset transistor and the second reset transistor are a thin film transistor including a channel layer formed of an oxide semiconductor.

(8) A display device according to some embodiments of the disclosure includes:

a display portion in which a plurality of scanning signal lines are disposed; and the scanning signal line drive circuit according to any one of the configurations from (1) to (7).

According to the scanning signal line drive circuit according to some embodiments of the disclosure, each of the unit circuits constituting the shift register is provided with the first reset transistor and the second reset transistor as the reset transistor for changing the potential of the node (first control node) connected to the control terminal of the output control transistor from the on level to the off level. Further, the first adjustment capacitor is provided between the first conduction terminal and the second conduction terminal of the first reset transistor, and the second adjustment capacitor is provided between the first conduction terminal and the second conduction terminal of the second reset transistor. In the above-described configuration, after the first reset transistor changes from the off state to the on state, the second reset transistor changes from the off state to the on state before the first reset transistor changes from the on state to the off state. Thus, in the process of changing the potential of the first control node from the on level to the complete off level, the potential of the first control node changes stepwise. Therefore, in the reset transistor, the voltage (drain-source voltage) between the first conduction terminal and the second conduction terminal at the time when the voltage (gate-source voltage) between the control terminal and the second conduction terminal has a value near a threshold voltage becomes smaller than that in the related art. Therefore, even when a display panel having a high drive voltage is employed for the display device, hot carrier degradation of the reset transistor in the scanning signal line drive circuit is suppressed or reduced. As described above, a scanning signal line drive circuit capable of suppressing occurrence of a display defect due to hot carrier degradation of a transistor is achieved. As a result, an effect of improving reliability of the display device and an effect of improving the yield in manufacturing the display device are obtained.

BRIEF DESCRIPTION OF DRAWINGS

The disclosure will be described with reference to the accompanying drawings, wherein like numbers reference like elements.

DESCRIPTION OF EMBODIMENTS

An embodiment will be described below with reference to the accompanying drawings. Note that all the thin film transistors in the following embodiments are N-channel transistors, but the disclosure is not limited thereto. In addition, in the N-channel transistor, of the two conduction terminals, one having a higher potential is a drain terminal and one having a lower potential is a source terminal, but in the present specification, even in a case where high and low of potentials of the two conduction terminals are inverted during operations, one of the two conduction terminals is fixedly referred to as the "drain terminal" and the other is fixedly referred to as the "source terminal".

1. Overall Configuration and Operation Outline

Figure 2:
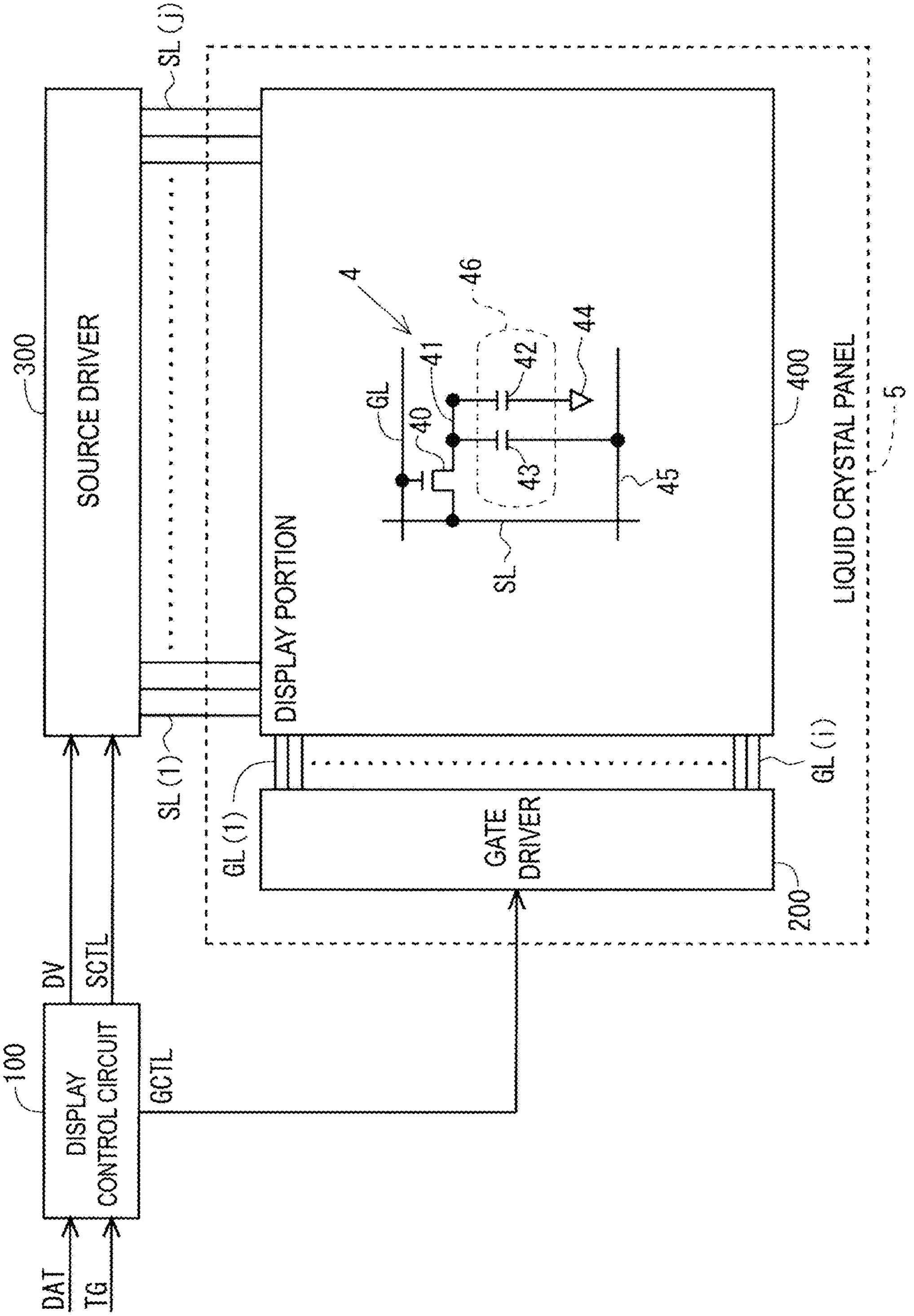
FIG. 2 is a block diagram illustrating an overall configuration of an active matrix liquid crystal display device according to the embodiment.

FIG. 2 is a block diagram illustrating an overall configuration of an active matrix liquid crystal display device according to an embodiment. The liquid crystal display device includes a display control circuit 100, a gate driver (scanning signal line drive circuit) 200, a source driver (image signal line drive circuit) 300, and a display portion 400. In the present embodiment, pixel circuits constituting the display portion 400 and the gate driver 200 are integrally formed on one substrate (active matrix substrate) of two substrates constituting a liquid crystal panel 5. In other words, the gate driver 200 according to the present embodiment is a monolithic gate driver.

The display portion 400 includes j number of (a plurality of) source bus lines (image signal lines) SL(1) to SL(j) and i number of (a plurality of) gate bus lines (scanning signal lines) GL(1) to GL(i) disposed therein. A pixel forming section 4 that forms a pixel is provided corresponding to each of intersections of the j number of (plurality of) source bus lines SL(1) to SL(j) and the i number of (plurality of) gate bus lines GL(1) to GL(i). In other words, the display portion 400 includes i×j (a plurality of) pixel forming sections 4 (however, in FIG. 2, only one pixel forming section 4 is illustrated). Each of the pixel forming sections 4 includes: a thin film transistor (pixel TFT) 40, which is a switching element having a gate terminal connected to the gate bus line GL passing through a corresponding intersection and a source terminal connected to the source bus line SL passing through this intersection; a pixel electrode 41 connected to a drain terminal of the thin film transistor 40; a common electrode 44 and an auxiliary capacitance electrode 45 provided commonly in the plurality of pixel forming sections 4; a liquid crystal capacitance 42 formed with the pixel electrode 41 and the common electrode 44; and an auxiliary capacitance 43 formed with the pixel electrode 41 and the auxiliary capacitance electrode 45. A pixel capacitance 46 includes the liquid crystal capacitance 42 and the auxiliary capacitance 43. Note that a configuration in which the auxiliary capacitance 43 is not provided (that is, a configuration in which the auxiliary capacitance electrode 45 is not provided) may be employed.

The display control circuit 100 receives an image signal DAT and a group of timing signals TG such as a horizontal synchronization signal and a vertical synchronization signal transmitted from the outside, and outputs a digital image signal DV, a gate control signal GCTL for controlling an operation of the gate driver 200, and a source control signal SCTL for controlling an operation of the source driver 300. That is, the display control circuit 100 controls the operations of the gate driver 200 and the source driver 300. Note that the gate control signal GCTL includes a gate start pulse signal and a gate clock signal, and the source control signal SCTL includes a source start pulse signal, a source clock signal, and a latch strobe signal.

The gate driver 200 repeats application of an active scanning signal to each of the gate bus lines GL in one vertical scanning period as a cycle, based on the gate control signal GCTL transmitted from the display control circuit 100. Note that a configuration may also be employed in which the gate driver 200 is provided on both one end side and the other end side of the gate bus lines GL(that is, a configuration in which the gate driver 200 is provided on both the left side and the right side of the display portion 400 in FIG. 2). The gate driver 200 will be described below in detail.

The source driver 300 applies a driving image signal to the source bus lines SL(1) to SL(j), based on the digital image signal DV and the source control signal SCTL transmitted from the display control circuit 100. At this time, the source driver 300 sequentially holds the digital image signals DV each indicating a voltage to be applied to a respective one of the source bus lines SL, at a timing when pulses of the source clock signal are generated. Then, the held digital image signals DV are converted into analog voltages at a timing when pulses of the latch strobe signal are generated. Such converted analog voltages, as the driving image signals, are applied simultaneously to all of the source bus lines SL(1) to SL(j).

As described above, the driving image signals are applied to the source bus lines SL(1) to SL(j), and the scanning signals are applied to the gate bus lines GL(1) to GL(i). As a result, an image based on the image signal DAT transmitted from the outside is displayed on the display portion 400.

2. Gate Driver

Figure 3:
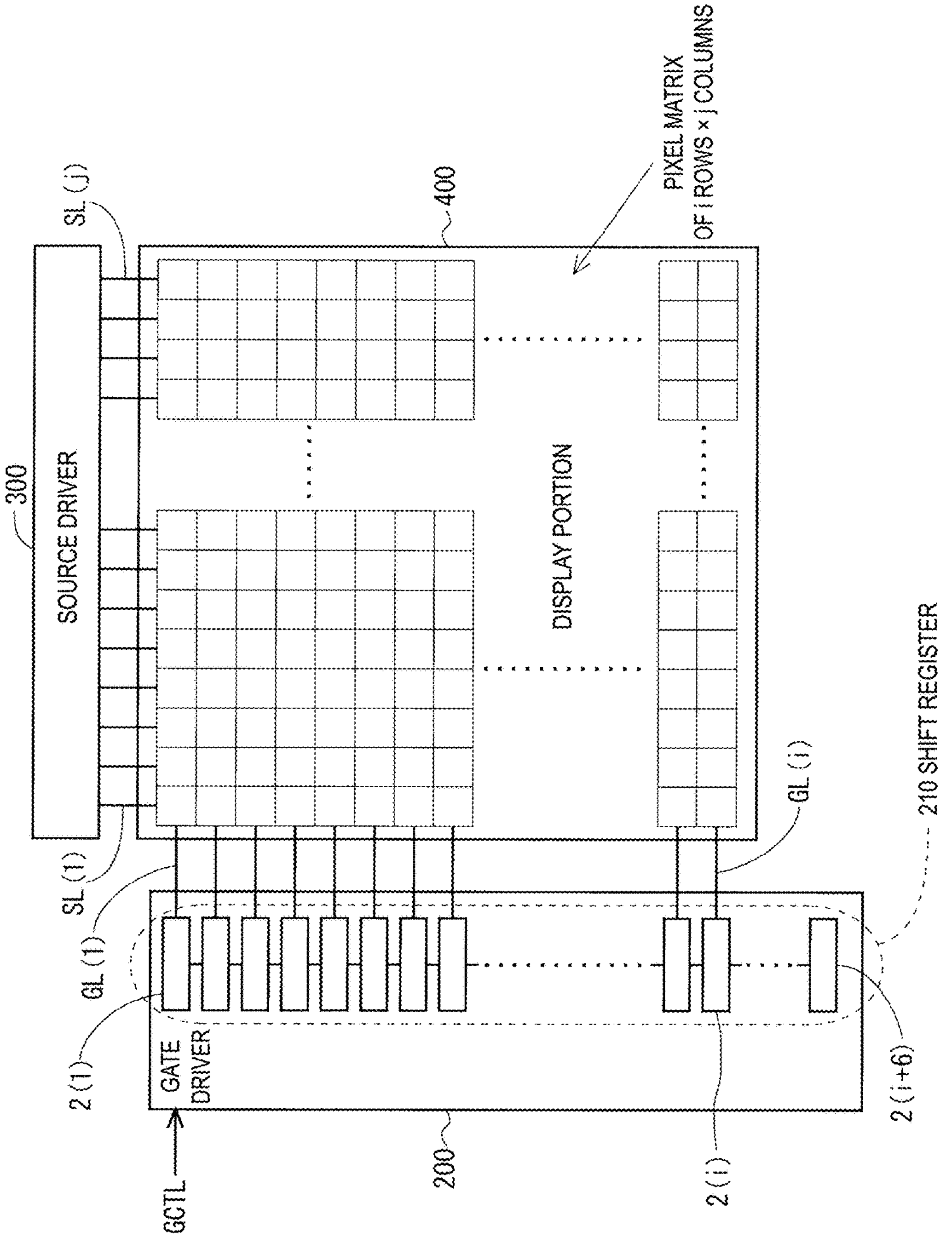
FIG. 3 is a block diagram for describing a schematic configuration of a gate driver according to the embodiment.

FIG. 3 is a block diagram for describing a schematic configuration of the gate driver 200 according to the present embodiment. As illustrated in FIG. 3, the gate driver 200 includes a shift register 210 including a plurality of stages. A pixel matrix of i rows×j columns is formed in the display portion 400, and the shift register 210 according to the present embodiment includes i stages corresponding to the i rows of the pixel matrix on a one-to-one basis and six stages as dummy stages. In other words, the shift register 210 includes (i+6) unit circuits 2(1) to 2(*i*+6). The unit circuits 2(1) to 2(*i*) of the first to ith stages among the (i+6) unit circuits 2(1) to 2(*i*+6) correspond to the i number of gate bus lines GL(1) to GL(i), respectively. Note that configuration in which a dummy stage is provided before the first stage may be employed, or a configuration in which a dummy stage is further provided after the (i+6)th stage may be employed. In addition, for example, instead of providing the unit circuits 2(*i*+1) to 2(*i*+6) as the dummy stages, a signal corresponding to an output signal from the dummy stage may be applied from the display control circuit 100 to the gate driver 200. The configuration and the operation of the gate driver 200 will be described below in detail.

2.1 Overall Configuration and Operation of Shift Register

Figure 4:
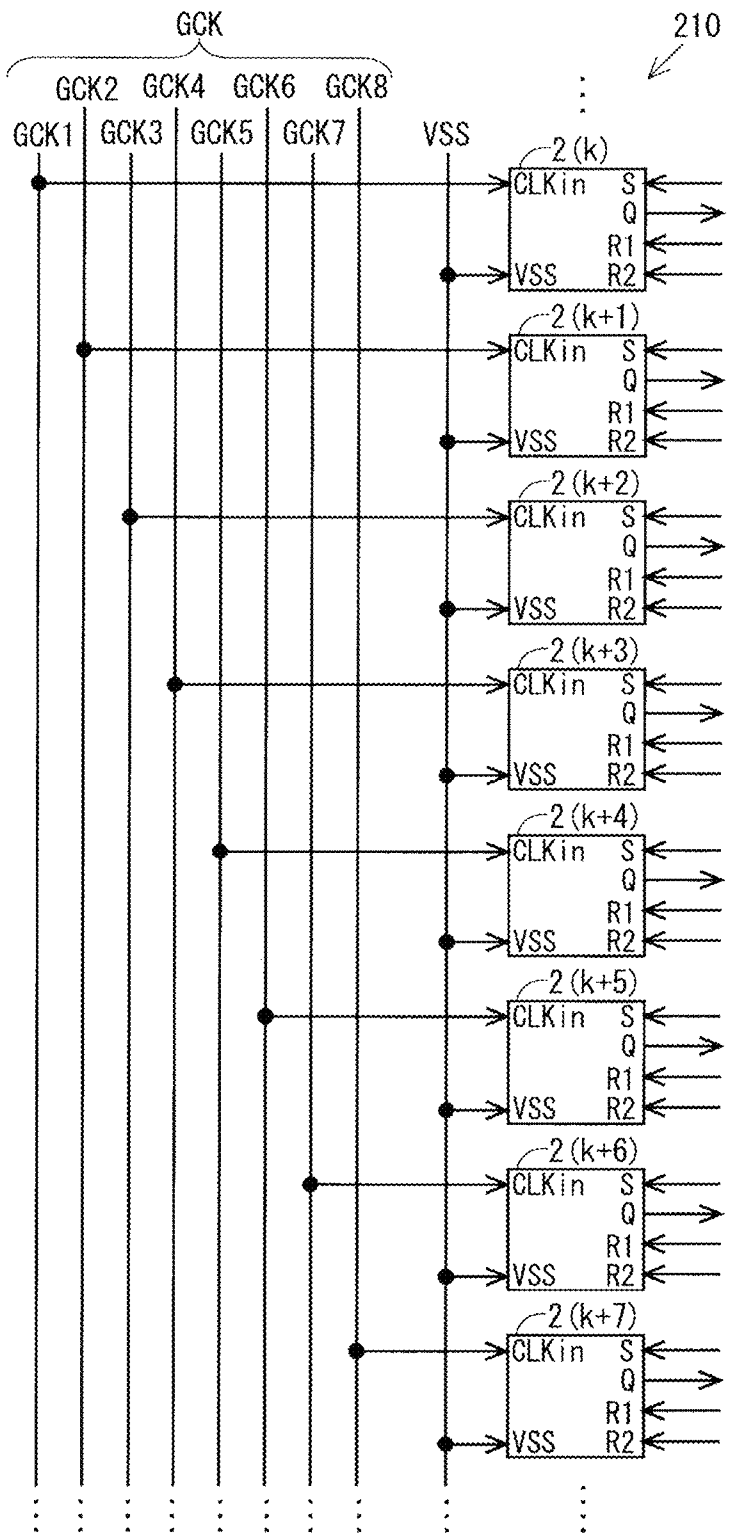
FIG. 4 is a block diagram illustrating a configuration of a shift register in the gate driver in the embodiment.

FIG. 4 is a block diagram illustrating a configuration of the shift register 210 in the gate driver 200. As described above, the shift register 210 is constituted by the (i+6) unit circuits 2(1) to 2(*i*+6). Note that, in FIG. 4, the unit circuits 2(*k*) to 2(*k*+7) provided at the kth stage to the (k+7)th stage are illustrated (k=1, 9, 17, . . . ). In the following description, the unit circuit is denoted by a reference sign 2 when there is no need to distinguish the (i+6) unit circuits 2(1) to 2(*i*+6) from each other.

As the gate control signal GCTL, the gate start pulse signal (not illustrated in FIG. 4) and gate clock signals GCK (GCK1 to GCK8) are applied to the shift register 210. A low-level DC power supply voltage VSS is also applied to the shift register 210. In the present embodiment, the gate clock signals GCK1 to GCK8 are an eight-phase clock signal having a duty ratio of 1/2. Note that, of the eight-phase clock signal, a clock signal input to each of the unit circuits 2 (hereinafter, referred to as an "input clock signal") is denoted by a reference sign CLKin.

Figure 5:
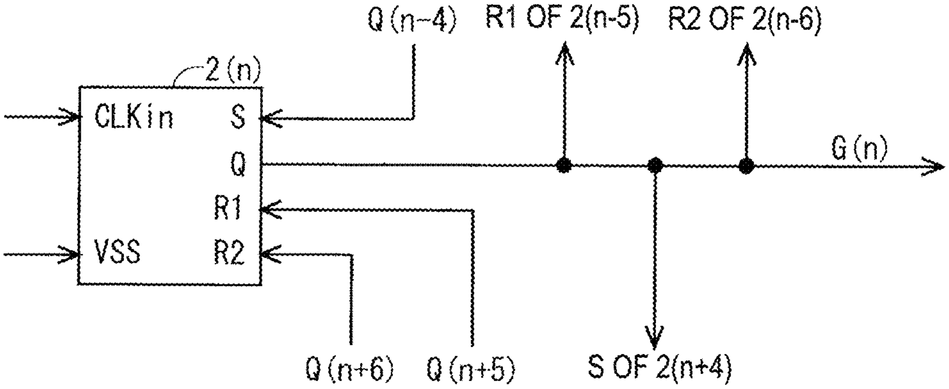
FIG. 5 is a diagram for describing input/output signals of the unit circuit according to the embodiment.

Signals as described below are applied to input terminals of the respective stages (respective unit circuits 2) of the shift register 210. The gate clock signal GCK1 is supplied to the unit circuit 2(*k*) of the kth stage as the input clock signal CLKin, the gate clock signal GCK2 is supplied to the unit circuit 2(*k*+1) of the (k+1)th stage as the input clock signal CLKin, the gate clock signal GCK3 is supplied to the unit circuit 2(*k*+2) of the (k+2)th stage as the input clock signal CLKin, the gate clock signal GCK4 is supplied to the unit circuit 2(*k*+3) of the (k+3)th stage as the input clock signal CLKin, the gate clock signal GCK5 is supplied to the unit circuit 2(*k*+4) of the (k+4)th stage as the input clock signal CLKin, the gate clock signal GCK6 is supplied to the unit circuit 2(*k*+5) of the (k+5)th stage as the input clock signal CLKin, the gate clock signal GCK7 is supplied to the unit circuit 2(*k*+6) of the (k+6)th stage as the input clock signal CLKin, and the gate clock signal GCK8 is supplied to the unit circuit 2(*k*+7) of the (k+7)th stage as the input clock signal CLKin. Such a configuration is repeated every eight stages through all the stages of the shift register 210. In this manner, the eight-phase clock signal (gate clock signals GCK1 to GCK8) cyclically corresponds to the plurality of unit circuits 2. As illustrated in FIG. 5, with respect to the unit circuit 2(*n*) of an arbitrary stage (nth stage in this case: n is an integer of 1 or more and i or less), the output signal Q(n−4) output from the unit circuit 2(*n*−4) of the fourth preceding-stage is supplied as a set signal S, the output signal Q(n+5) output from the unit circuit 2(*n*+5) of the fifth subsequent-stage is supplied as a first reset signal R1, and the output signal Q(n+6) output from the unit circuit 2(*n*+6) of the sixth subsequent-stage is supplied as a second reset signal R2. However, the gate start pulse signal is supplied as the set signal S to the unit circuits 2(1) to 2(4) of the first to fourth stages. The low-level DC power supply voltage VSS is applied commonly to all of the unit circuits 2(1) to 2(*i*+6). Note that a potential corresponding to the low-level DC power supply voltage VSS is referred to as a "VSS potential" for convenience.

The output signal Q is output from an output terminal at each of the stages (of each of the unit circuits 2) of the shift register 210 (see FIG. 5). The output signal Q(n) output from an arbitrary stage (the above nth stage) is supplied to the nth gate bus line GL(n) as a scanning signal G(n), and additionally, is supplied to the unit circuit 2(*n*−5) of the fifth preceding-stage as the first reset signal R1, is supplied to the unit circuit 2(*n*−6) of the sixth preceding-stage as the second reset signal R2, and is supplied to the unit circuit 2(*n*+4) of the fourth subsequent-stage as the set signal S.

Figure 6:
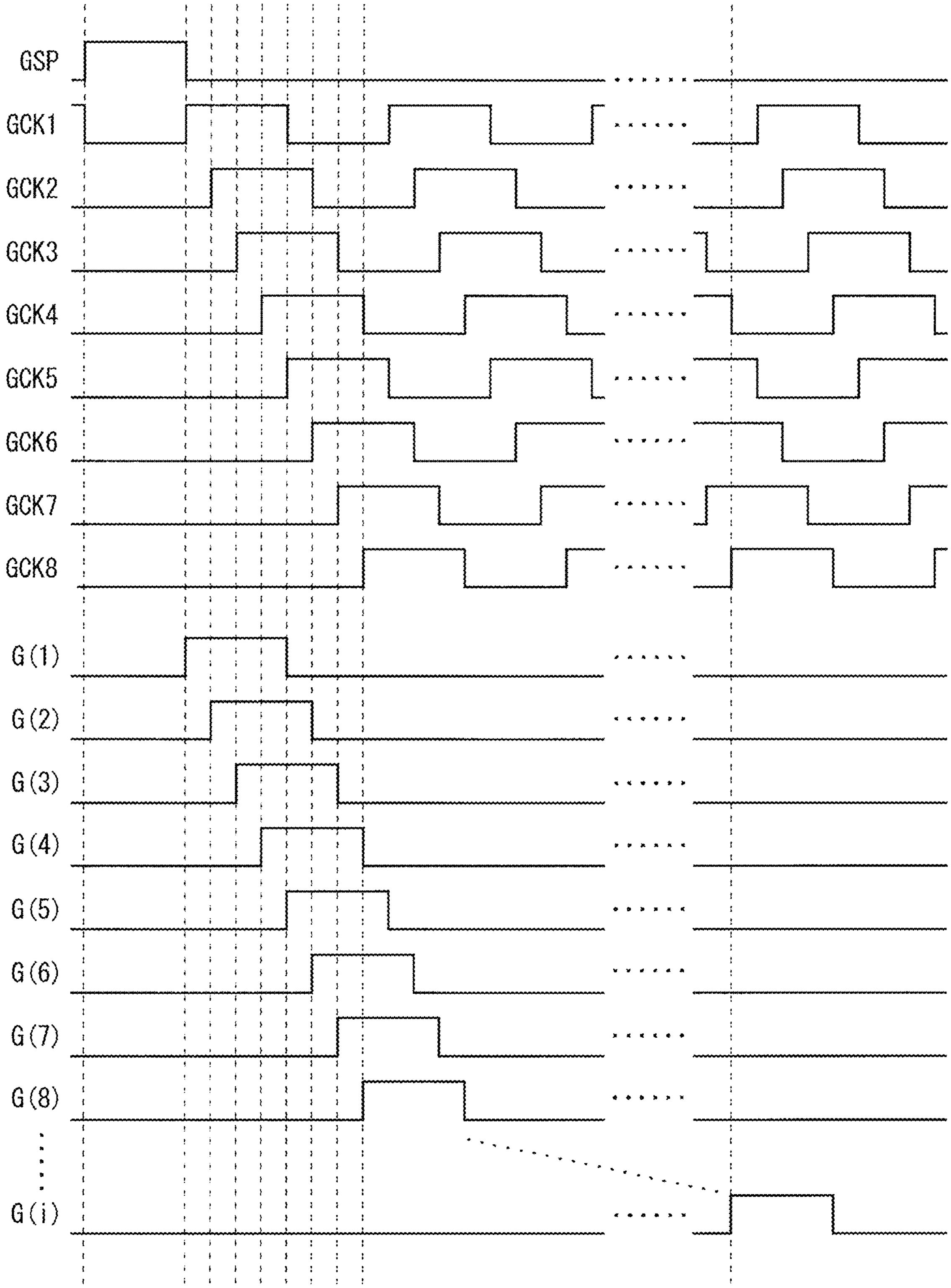
FIG. 6 is a signal waveform diagram for describing operations of the gate driver according to the embodiment.

FIG. 6 is a signal waveform diagram for describing the operation of the gate driver 200. In the configuration described above, after a pulse of a gate start pulse signal GSP is generated, on the basis of a clock operation of the gate clock signals GCK1 to GCK8, a shift pulse included in the output signal Q output from each of the unit circuits 2 is transferred to the subsequent stage side (in other words, shift operation is performed). Then, in response to the transfer of the shift pulse, the output signals Q output from the respective unit circuits 2 are sequentially set to be at a high level. As a result, as illustrated in FIG. 6, the scanning signals G(1) to G(i), which are sequentially set to be at the high level (active) for a predetermined period each time, are applied to the gate bus lines GL(1) to GL(i) in the display portion 400, respectively. In other words, i number of gate bus lines GL(1) to GL(i) are sequentially set to be in a select state.

2.2 Configuration of Unit Circuit

Figure 1:
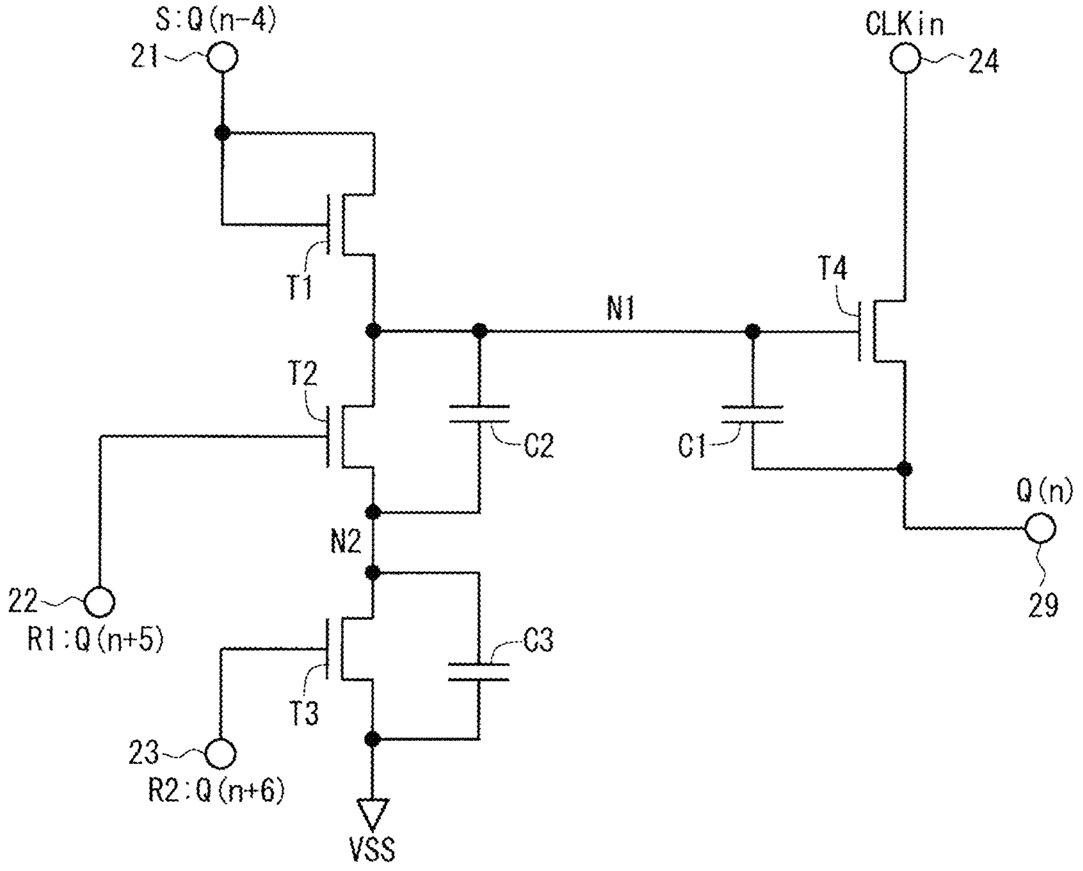
FIG. 1 is a circuit diagram illustrating a configuration of a unit circuit (configuration of one stage of a shift register) according to an embodiment.
Figure 17:
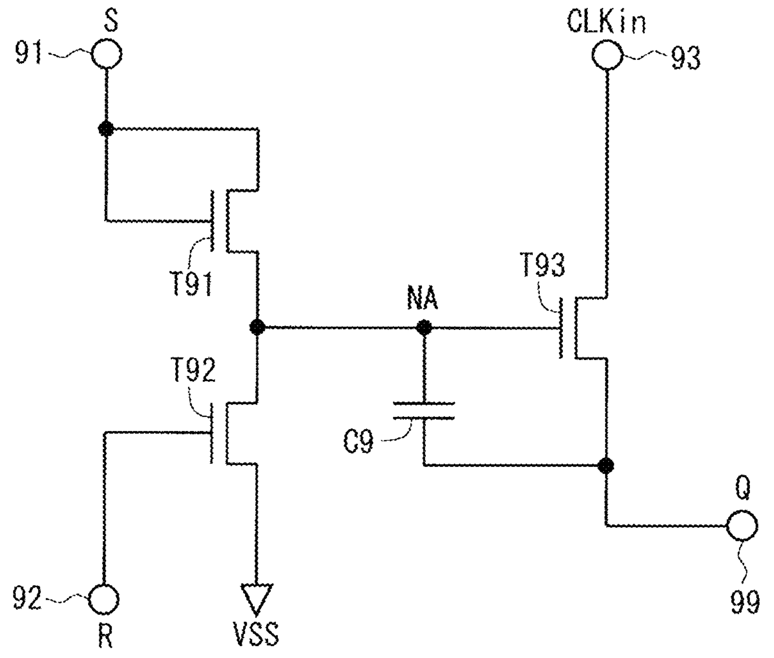
FIG. 17 is a circuit diagram illustrating a configuration example of a known unit circuit.

FIG. 1 is a circuit diagram illustrating a configuration of the unit circuit 2(*n*) of the nth stage (configuration of one stage of the shift register 210) according to the present embodiment. As illustrated in FIG. 1, the unit circuit 2(*n*) includes four thin film transistors (a set transistor T1, a first reset transistor T2, a second reset transistor T3, and an output control transistor T4) and three capacitors (capacitance elements) (a first capacitor C1, a second capacitor C2, and a third capacitor C3). The unit circuit 2 includes four input terminals 21 to 24 and one output terminal (output node) 29, in addition to an input terminal for the low-level DC power supply voltage VSS (that is, input terminal to which the potential at the low level (off level) is supplied). Here, the input terminal for receiving the set signal S is denoted by a sign 21, the input terminal for receiving the first reset signal R1 is denoted by a sign 22, the input terminal for receiving the second reset signal R2 is denoted by a sign 23, and the input terminal for receiving the input clock signal CLKin is denoted by a sign 24. Note that an internal node connected to the gate terminal of the output control transistor T4 is referred to as a "first control node", and an internal node connected to the source terminal of the first reset transistor T2 and the drain terminal of the second reset transistor T3 is referred to as a "second control node". The first control node is denoted by a sign N1 and the second control node is denoted by a sign N2. The first control node N1 corresponds to the control node NA in the known unit circuit (see FIG. 17).

As for the set transistor T1, the gate terminal and the drain terminal both are connected to the input terminal 21 (that is, diode-connected), and the source terminal is connected to the first control node N1. Note that it is also possible to employ a configuration in which the drain terminal of the set transistor T1 is supplied with an on-level potential (for example, a configuration in which the drain terminal of the set transistor T1 is connected to an input terminal for a high-level DC power supply voltage). As for the first reset transistor T2, the gate terminal is connected to the input terminal 22, the drain terminal is connected to the first control node N1, and the source terminal is connected to the second control node N2. As for the second reset transistor T3, the gate terminal is connected to the input terminal 23, the drain terminal is connected to the second control node N2, and the source terminal is connected to the input terminal for the low-level DC power supply voltage VSS. As for the output control transistor T4, the gate terminal is connected to the first control node N1, the drain terminal is connected to the input terminal 24, and the source terminal is connected to the output terminal 29. As for the first capacitor C1, one end thereof is connected to the first control node N1, and the other end thereof is connected to the output terminal 29. As for the second capacitor C2, one end thereof is connected to the first control node N1, and the other end thereof is connected to the second control node N2. As for the third capacitor C3, one end is connected to the second control node N2, and the other end thereof is connected to an input terminal for the low-level DC power supply voltage VSS.

Note that in the present embodiment, a boost capacitor is achieved by the first capacitor C1, a first adjustment capacitor is achieved by the second capacitor C2, and a second adjustment capacitor is achieved by the third capacitor C3. A control terminal is achieved by the gate terminal, a first conduction terminal is achieved by the drain terminal, and a second conduction terminal is achieved by the source terminal.

In the present embodiment, the output signal Q(n−4) output from the unit circuit 2(*n*−4) of the (n−4)th stage is supplied to the input terminal 21 as the set signal S, the output signal Q(n+5) output from the unit circuit 2(*n*+5) of the (n+5)th stage is supplied to the input terminal 22 as the first reset signal R1, and the output signal Q(n+6) output from the unit circuit 2(*n*+6) of the (n+6)th stage is supplied to the input terminal 23 as the second reset signal R2.

As for the above-described four thin film transistors (the set transistor T1, the first reset transistor T2, the second reset transistor T3, and the output control transistor T4) in the unit circuit 2 and the thin film transistor 40 in the pixel forming section 4, for example, a thin film transistor (oxide semiconductor TFT) in which a channel layer is formed of an oxide semiconductor can be employed. More specifically, a thin film transistor in which the channel layer is formed by In—Ga—Zn—O (indium gallium zinc oxide) that is an oxide semiconductor containing indium (In), gallium (Ga), zinc (Zn), and oxygen (O) as main components can be employed. As a result, for example, an effect of enabling reduction in the size and power consumption of the device is obtained. However, a thin film transistor other than the oxide semiconductor TFT may be employed. For example, a thin film transistor using low-temperature polysilicon for a channel layer may be employed.

2.3 Operations of Unit Circuit

Figure 7:
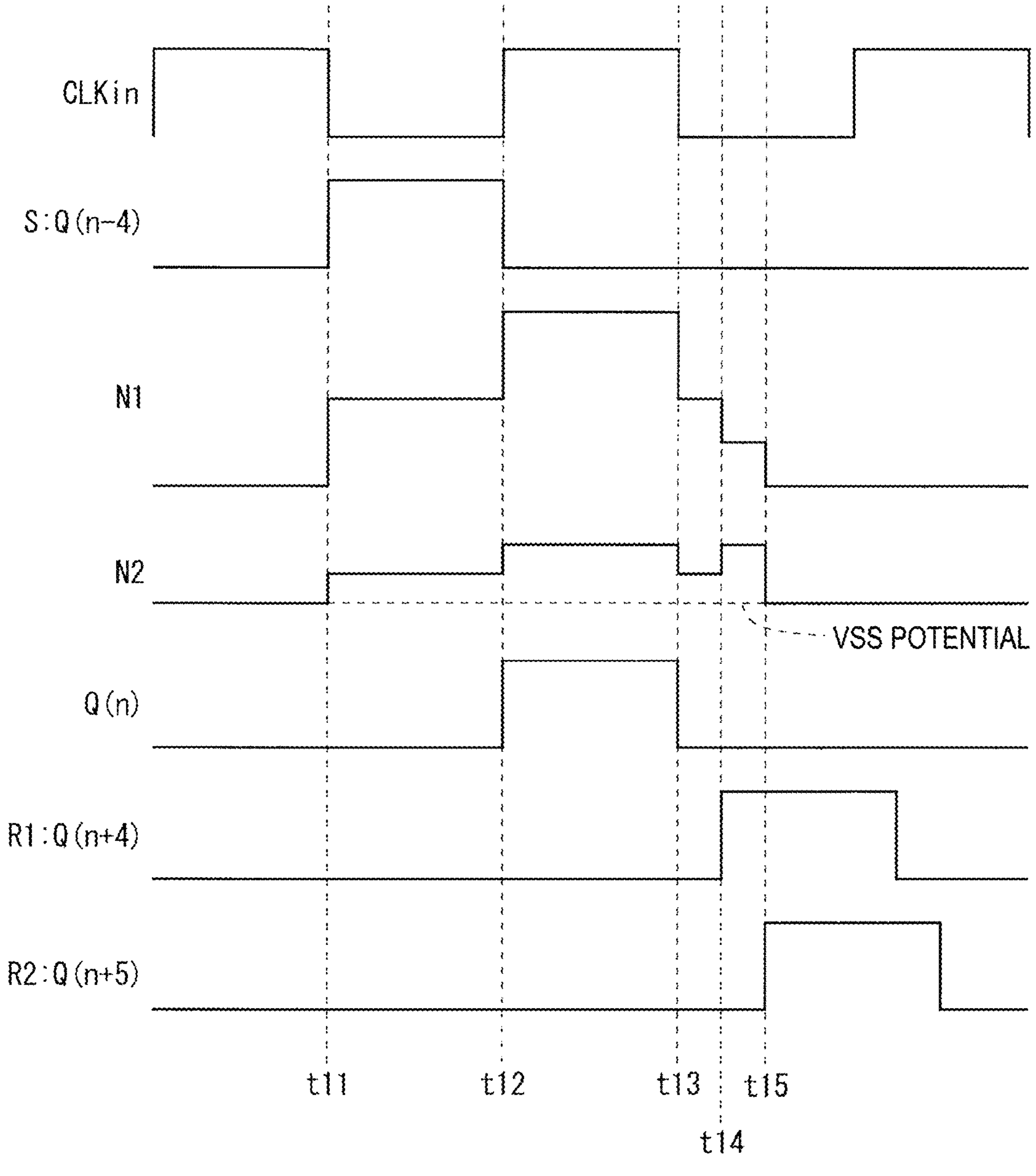
FIG. 7 is a signal waveform diagram for describing operations of the unit circuit according to the embodiment.

The operation of the unit circuit 2(*n*) of the nth stage according to the present embodiment will be described with reference to FIG. 7. In the period before time t11, the potential of the first control node N1, the potential of the second control node N2, and the potential of the output signal Q(n) (the potential of the output terminal 29) are at the low level.

At the time t11, the set signal S changes from the low level (off level) to the high level (on level). Since the set transistor T1 is diode-connected as illustrated in FIG. 1, due to the set signal S changing to the high level, the set transistor T1 goes into an on state, and thus the potential of the first control node N1 changes from the low level to the high level. As a result, the output control transistor T4 goes into the on state. Since the second capacitor C2 is provided between the first control node N1 and the second control node N2, the potential of the second control node N2 increases as the potential of the first control node N1 changes from the low level to the high level. Although the output control transistor T4 goes into the on state as described above, the input clock signal CLKin is maintained at the low level during the period from the time t11 to time t12. Due to this, during this period, the output signal Q(n) is maintained at the low level.

At the time t12, the input clock signal CLKin changes from the low level to the high level. At this time, since the output control transistor T4 is in the on state, the potential of the output terminal 29 increases along with an increase in the potential of the input terminal 24. Here, since the first capacitor C1 is provided between the first control node N1 and the output terminal 29 as illustrated in FIG. 1, the potential of the first control node N1 also increases along with an increase in the potential of the output terminal 29 (the first control node N1 is set to be in a boost state). As a result, a large voltage is applied to the gate terminal of the output control transistor T4, and the potential of the output signal Q(n) increases up to a level sufficient to cause the gate bus line GL(n) connected to the output terminal 29 to be in the select state. Further, in association with the increase in the potential of the first control node N1, the potential of the second control node N2 also increases.

At time t13, the input clock signal CLKin changes from the high level to the low level. As a result, the potential of the output terminal 29 decreases along with a decrease in the potential of the input terminal 24. That is, the potential of the output signal Q(n) is set to be at the low level. Also, the potential of the first control node N1 decreases via the first capacitor C1. Thus, the potential of the second control node N2 also decreases via the second capacitor C2. Note that the potential of the second control node N2 immediately after the time t13 is substantially equal to the potential of the second control node N2 immediately before the time t12.

At time t14, the first reset signal R1 changes from the low level to the high level. Thus, the first reset transistor T2 goes into the on state. As a result, the potential of the first control node N1 and the potential of the second control node N2 become equal to each other. At this time, the potential of the first control node N1 decreases, and the potential of the second control node N2 increases.

At time t15, the second reset signal R2 changes from the low level to the high level. Thus, the second reset transistor T3 goes into the on state. At this time, the first reset transistor T2 is in the on state. According to this, the potential of the first control node N1 and the potential of the second control node N2 decrease to the VSS potential.

3. Advantageous Effects

According to the present embodiment, each of the unit circuits 2 constituting the shift register 210 is provided with two thin film transistors (the first reset transistor T2 and the second reset transistor T3) as reset transistors for changing the potential of the node (first control node N1) connected to the gate terminal of the output control transistor T4 from the high level (on level) to the low level (off level). Further, the second capacitor C2 is provided between the drain terminal and the source terminal of the first reset transistor T2, and the third capacitor C3 is provided between the drain terminal and the source terminal of the second reset transistor T3. In the above-described configuration, after the first reset transistor T2 changes from the off state to the on state, the second reset transistor T3 changes from the off state to the on state before the first reset transistor T2 changes from the on state to the off state. As a result, in the process of changing the potential of the first control node N1 from the high level to the complete low level (VSS potential), the potential of the first control node N1 changes stepwise. Therefore, with respect to the reset transistor, a drain-source voltage Vds at the time when a gate-source voltage Vgs has a value near a threshold voltage Vth becomes smaller than that in the related art. As such, even when the liquid crystal panel 5 having a high drive voltage is employed in the display device, hot carrier degradation of the reset transistors (the first reset transistor T2 and the second reset transistor T3) in the gate driver 200 is suppressed or reduced. As described above, according to the present embodiment, the gate driver (scanning signal line drive circuit) 200 capable of suppressing occurrence of a display defect caused by the hot carrier degradation of the thin film transistor is achieved. In addition, an effect of improving the reliability of the display device and an effect of improving the yield at the time of manufacturing the display device are also obtained.

Hereinafter, with reference to FIGS. 8 and 9, it will be described in more detail that the hot carrier degradation of the thin film transistor can be suppressed or reduced by the present embodiment.

Figure 8:
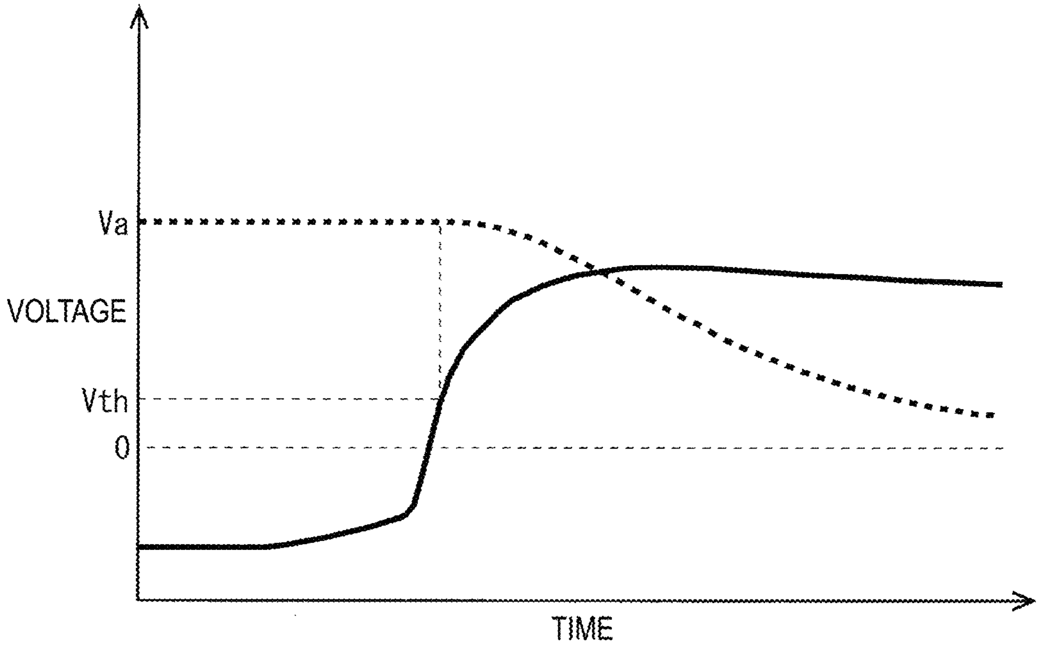
FIG. 8 is a diagram for describing an effect of the embodiment.
Figure 9:
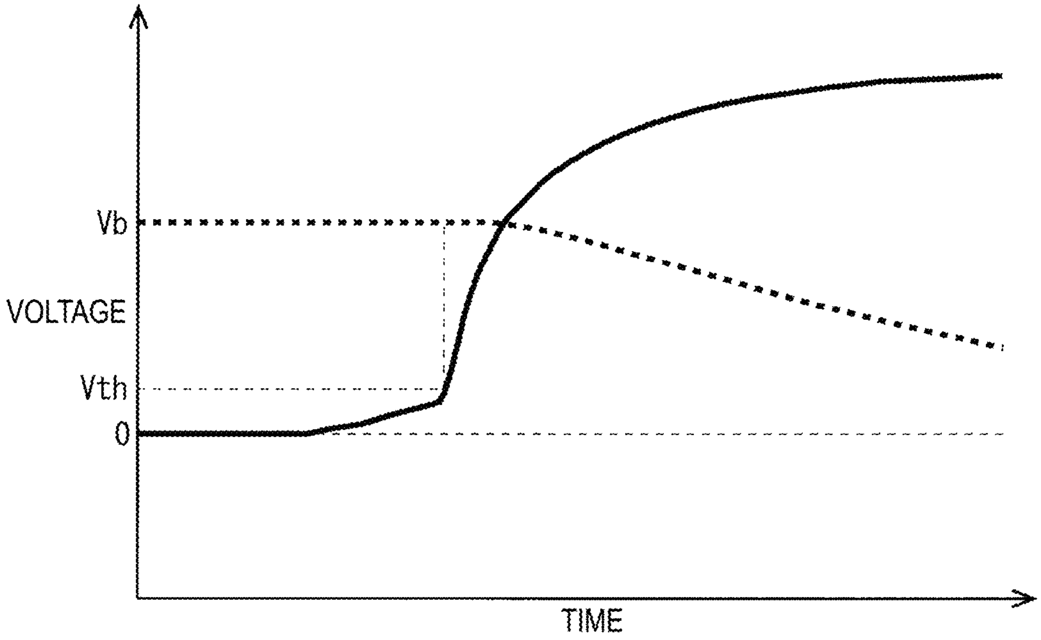
FIG. 9 is a diagram for describing an effect of the embodiment.

FIG. 8 is a diagram illustrating changes in the gate-source voltage Vgs and the drain-source voltage Vds of the first reset transistor T2 in a period near the time t14 (a period before and after the first reset transistor T2 changes from the off state to the on state) in the operation (see FIG. 7) of the unit circuit 2. FIG. 9 is a diagram illustrating changes in the gate-source voltage Vgs and the drain-source voltage Vds of the second reset transistor T3 in a period near the time t15 (a period before and after the second reset transistor T3 changes from the off state to the on state) in the operation (see FIG. 7) of the unit circuit 2. In FIGS. 8 and 9, a thick solid line indicates a change in the gate-source voltage Vgs, and a thick dotted line indicates a change in the drain-source voltage Vds. Note that hereinafter, for convenience of description, the drain-source voltage Vds of the reset transistor (the reset transistor T92 of the example in the related art and the first reset transistor T2 and the second reset transistor T3 in the present embodiment) at the time when the gate-source voltage Vgs of the reset transistor has a value near the threshold voltage Vth in the process in which the reset transistor changes from the off state to the on state is referred to as "focused Vds".

In the known unit circuit (see FIG. 17), one thin film transistor (the reset transistor T92) is provided as a constituent element for changing the potential of the node (the control node NA) connected to the gate terminal of the output control transistor T93 from the high level to the low level. On the other hand, in the unit circuit (see FIG. 1) according to the present embodiment, two thin film transistors (the first reset transistor T2 and the second reset transistor T3) are provided as constituent elements for decreasing the potential of the node (the first control node N1) connected to the gate terminal of the output control transistor T4 from the high level to the low level. Therefore, first, the focused Vds of the first reset transistor T2 is compared with the focused Vds of the reset transistor T92, and then the focused Vds of the second reset transistor T3 is compared with the focused Vds of the reset transistor T92.

Figure 18:
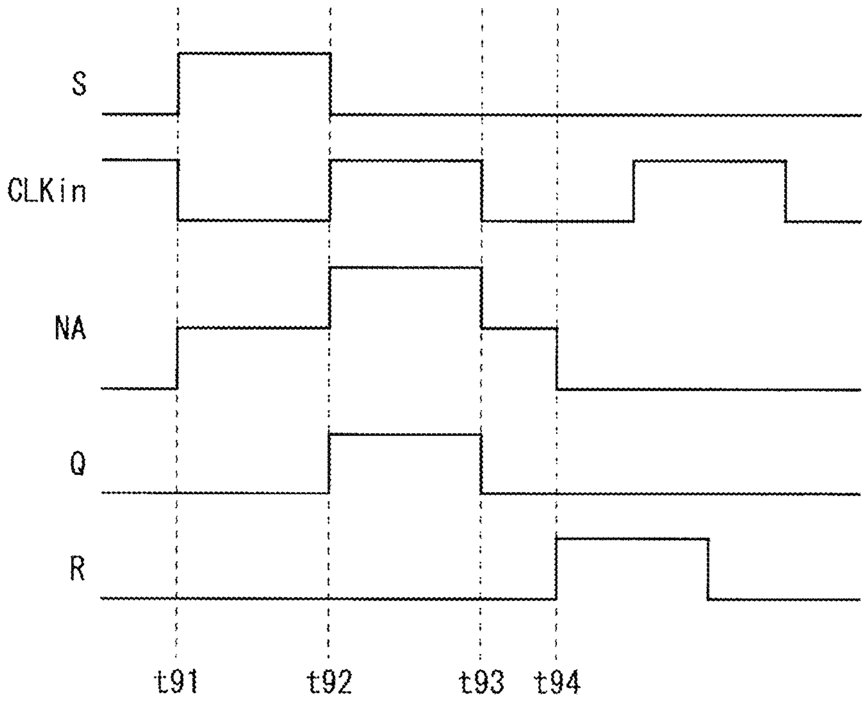
FIG. 18 is a signal waveform diagram for describing operations of the known unit circuit.
Figure 19:
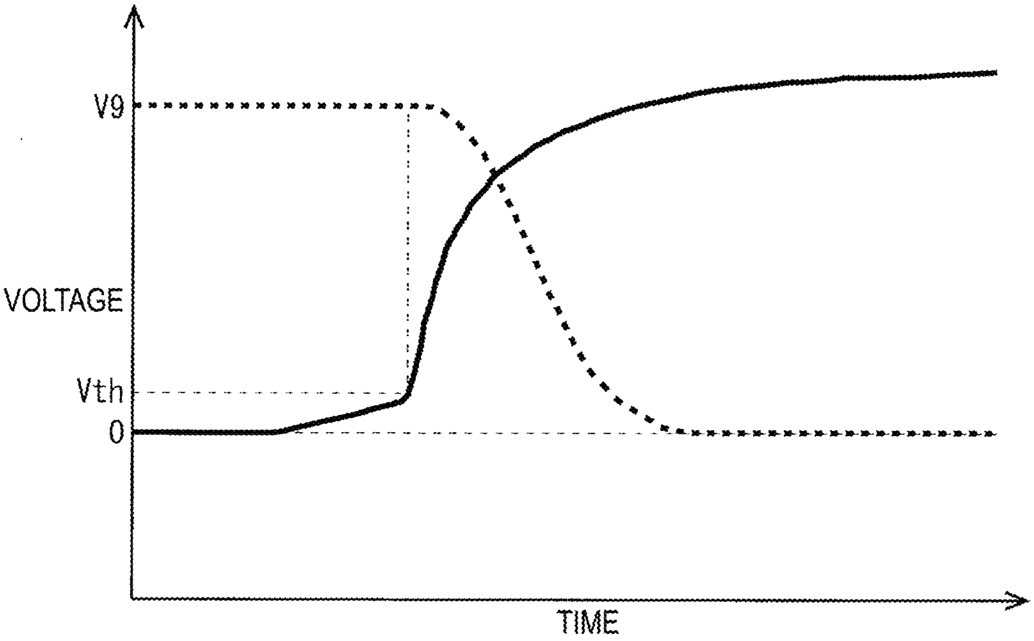
FIG. 19 is a diagram for describing the hot carrier degradation as to an example in the related art.

The source terminal of the reset transistor T92 is connected to the input terminal for the low-level DC power supply voltage VSS, whereas the source terminal of the first reset transistor T2 is connected to the second control node N2. As can be understood from FIG. 7, the potential of the second control node N2 immediately before the time point (time t14) at which the first reset transistor T2 changes from the off state to the on state is higher than the VSS potential. Therefore, the source potential of the first reset transistor T2 immediately before the time point at which the first reset transistor T2 changes from the off state to the on state is higher than the source potential of the reset transistor T92 immediately before the time point (time t94 in FIG. 18) at which the reset transistor T92 changes from the off state to the on state. Therefore, the focused Vds of the first reset transistor T2 (voltage Va in FIG. 8) is smaller than the focused Vds of the reset transistor T92 (voltage V9 in FIG. 19).

The drain terminal of the reset transistor T92 is connected to the control node NA, whereas the drain terminal of the second reset transistor T3 is connected to the second control node N2. Immediately before the time point (time t15 in FIG. 7) at which the second reset transistor T3 changes from the off state to the on state, the potential of the second control node N2 is equal to the potential of the first control node N1 as described above. As can be seen from FIG. 7, the potential of the first control node N1 decreases as the input clock signal CLKin changes from the high level to the low level at the time t13, and then further decreases due to the first reset transistor T2 going into the on state at the time t14. As described above, the drain potential of the second reset transistor T3 immediately before the time point at which the second reset transistor T3 changes from the off state to the on state is lower than the drain potential of the reset transistor T92 immediately before the time pint (time t94 in FIG. 18) at which the reset transistor T92 changes from the off state to the on state. Therefore, the focused Vds of the second reset transistor T3 (voltage Vb in FIG. 9) is smaller than the focused Vds of the reset transistor T92 (voltage V9 in FIG. 19).

As described above, the focused Vds of each of the first reset transistor T2 and the second reset transistor T3 is smaller than that of the reset transistor T92. That is, both the first reset transistor T2 and the second reset transistor T3 are prevented from receiving a strong voltage stress when the gate-source voltage Vgs has a value near the threshold voltage Vth. Note that by adjusting a capacitance value of each of the first to third capacitors C1 to C3, the focused Vds of each of the first reset transistor T2 and the second reset transistor T3 can be adjusted.

As an example, with respect to the focused Vds being smaller than that in the related art, when the unit circuit 2 is configured to satisfy "the capacitance value of the first capacitor C1=the capacitance value of the second capacitor C2=(1/2)×the capacitance value of the third capacitor C3=2.0 pF" in a 27-inch liquid crystal panel in which Vgpp (the difference between the maximum and minimum values of the voltage of the scanning signal) is 41 V, the focused Vds is reduced from 37 V in the known configuration to 25 V. Since the focused Vds is smaller as described above, the hot carrier degradation of the thin film transistor in the gate driver 200 is suppressed or reduced even when the liquid crystal panel 5 having a high drive voltage is employed.

4. Modified Example

In the above embodiment, the gate clock signal GCK for causing the shift register 210 to operate is the eight-phase clock signal having the duty ratio of 1/2. In the unit circuit 2(*n*) constituting the shift register 210, the output signal Q(n−4) output from the unit circuit 2(*n*−4) of a stage four stages before a current stage is supplied as the set signal S, the output signal Q(n+5) output from the unit circuit 2(*n*+5) of a stage five stages after the current stage is supplied as the first reset signal R1, and the output signal Q(n+6) output from the unit circuit 2(*n*+6) of a stage six stages after the current stage is supplied as the second reset signal R2 (see FIG. 1). However, the disclosure is not limited thereto. A relationship (relationship that can be applied to the disclosure) between the number of phases of the gate clock signal GCK, the duty ratio of the gate clock signal GCK, the set signal S, the first reset signal R1, and the second reset signal R2 will now be described.

Here, the number of phases of the gate clock signal GCK is represented by P, and the duty ratio of the gate clock signal GCK is represented by D. Assuming that in the unit circuit 2(*n*) of the nth stage, the output signal Q(n−z) output from the unit circuit 2(*n*−z) of the (n−z)th stage is supplied as the set signal S, the output signal Q(n+x) output from the unit circuit 2(*n*+x) of the (n+x)th stage is supplied as the first reset signal R1, and the output signal Q(n+y) output from the unit circuit 2(*n*+y) of the (n+y)th stage is supplied as the second reset signal R2.

Figure 10:
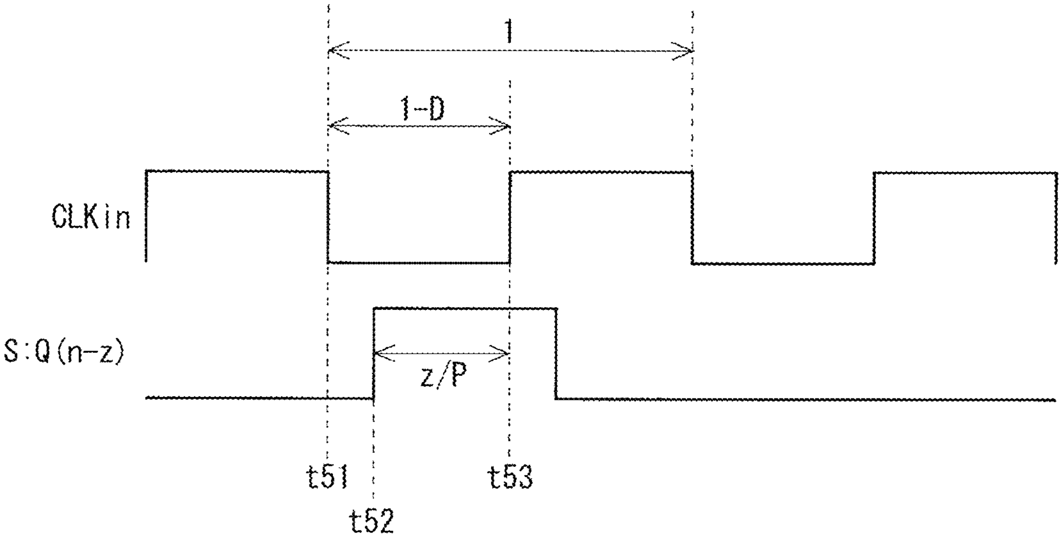
FIG. 10 is a signal waveform diagram for describing conditions of a set signal in a modified example of the embodiment.

When the potential of the first control node N1 changes from the low level to the high level as a result of the set signal S changing from the low level to the high level during the period in which the input clock signal CLKin is maintained at the high level in the unit circuit 2(*n*), the potential of the output signal Q(n) increases when the output control transistor T4 changes from the off state to the on state in accordance with the change in the potential of the first control node N1. At this time, the operation of the gate driver 200 becomes abnormal. Therefore, the set signal S needs to change from the low level to the high level when the input clock signal CLKin is at the low level. Assuming that the clock cycle of the input clock signal CLKin is 1, a length of the period during which the input clock signal CLKin is maintained at the low level is 1-D (see FIG. 10). Here, assuming that the time point at which the output signal Q(n) needs to change from the low level to the high level is time t53 in FIG. 10, a length of the period from the time point (time t52 in FIG. 10) at which the set signal S (output signal Q(n−z)) changes from the low level to the high level to the time t53 is z/P. In order for the input clock signal CLKin to be at the low level when the set signal S changes from the low level to the high level, it is necessary to satisfy the following expression (1), $$z/P \leq 1 - D. \tag{1}$$

Figure 11:
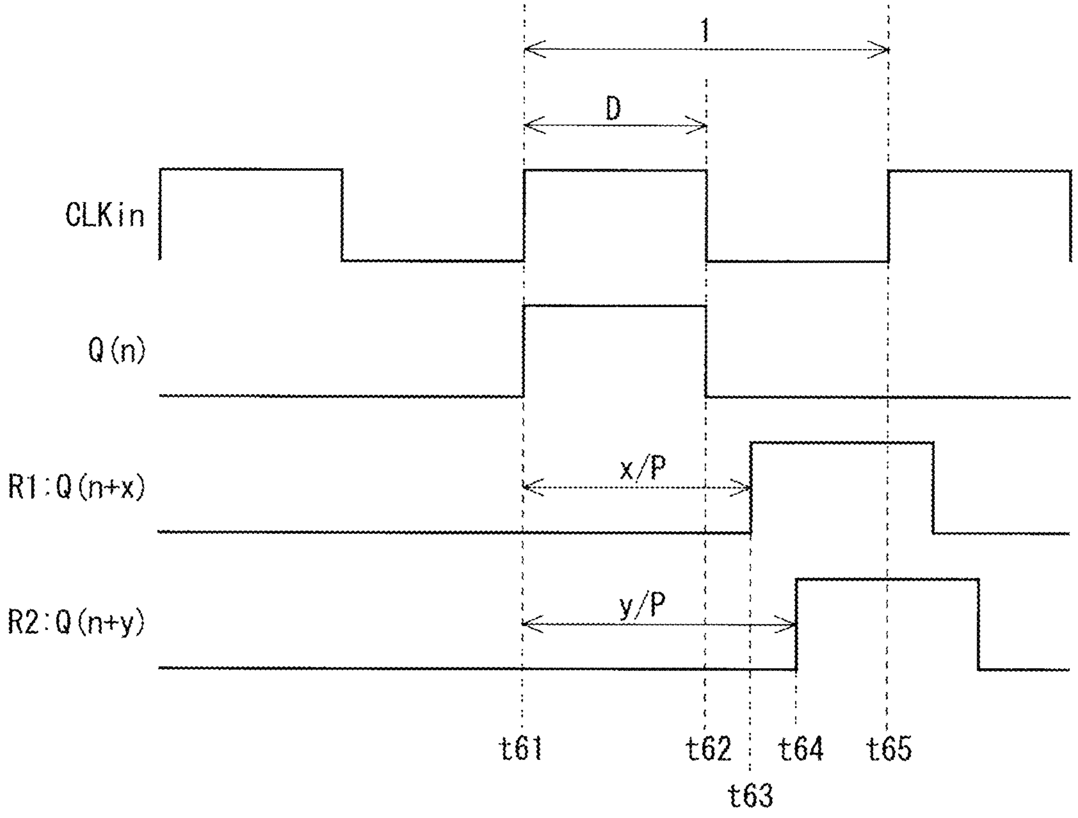
FIG. 11 is a signal waveform diagram for describing conditions of a first reset signal and a second reset signal in the modified example.

Note that the potential of the first control node N1 needs to change from the high level to the low level after the output signal Q(n) changes from the high level to the low level as the input clock signal CLKin changes from the high level to the low level and before the input clock signal CLKin changes in turn from the low level to the high level. This is because when the input clock signal CLKin changes from the low level to the high level during the period in which the potential of the first control node N1 is maintained at the high level, the potential of the output signal Q(n) increases and the operation of the gate driver 200 becomes abnormal. As illustrated in FIG. 11, a length of the period from the time point (time t61) at which the output signal Q(n) changes from the low level to the high level to the time point (time t63) at which the first reset signal R1 (output signal Q(n+x)) changes from the low level to the high level is x/P, and a length of the period from the time point (time t61) at which the output signal Q(n) changes from the low level to the high level to the time point (time t64) at which the second reset signal R2 (output signal Q(n+y)) changes from the low level to the high level is y/P. In order for the first reset signal R1 to change from the low level to the high level after the time point (time t62) at which the output signal Q(n) changes from the high level to the low level, the following expression (2) needs to be satisfied, and in order for the second reset signal R2 to change from the low level to the high level by the time point (time t65) at which the output signal Q(n) changes from the high level to the low level and then, in turn, the input clock signal CLKin changes from the low level to the high level, the following expression (3) needs to be satisfied. Note that in order for the second reset signal R2 to change from the low level to the high level after the first reset signal R1 changes from the low level to the high level, the following expression (4) needs to be satisfied, $$x/P > D \tag{2}$$

$$y/P < 1 \tag{3}$$

$$y > x. \tag{4}$$

Figure 12:
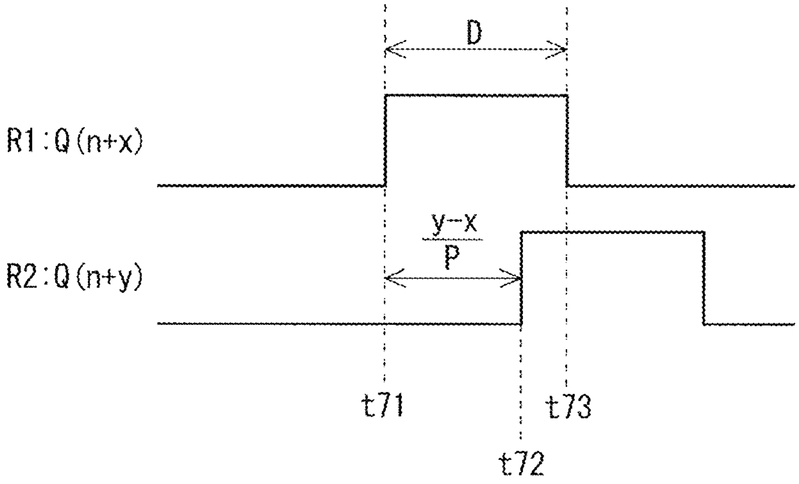
FIG. 12 is a signal waveform diagram for describing conditions of the first reset signal and the second reset signal in the modified example.

When the first reset transistor T2 is in the off state when the second reset transistor T3 changes from the off state to the on state, the potential of the first control node N1 does not decrease to the VSS potential even when the second reset transistor T3 changes from the off state to the on state. Therefore, the first reset transistor T2 needs to be in the on state when the second reset transistor T3 changes from the off state to the on state. That is, as illustrated in FIG. 12, the second reset signal R2 needs to change from the low level to the high level after the time point (time t71) at which the first reset signal R1 changes from the low level to the high level and before the time point (time t73) at which the first reset signal R1 changes from the high level to the low level. In consideration of the above expression (4), a length of the period from the time point (time t71) at which the first reset signal R1 changes from the low level to the high level to the time point (time t72) at which the second reset signal R2 changes from the low level to the high level is (y−x)/P. As described above, after the first reset signal R1 changes from the low level to the high level, in order for the second reset signal R2 to change from the low level to the high level before the first reset signal R1 changes from the high level to the low level, the following expression (5) needs to be satisfied, $$(y - x)/P < D. \tag{5}$$

The above embodiment (P=8, D=1/2, x=4, y=5, z=4) satisfies the above expressions (1) to (5). Two specific examples satisfying the above expressions (1) to (5) other than the above embodiment will be described below.

Figure 13:
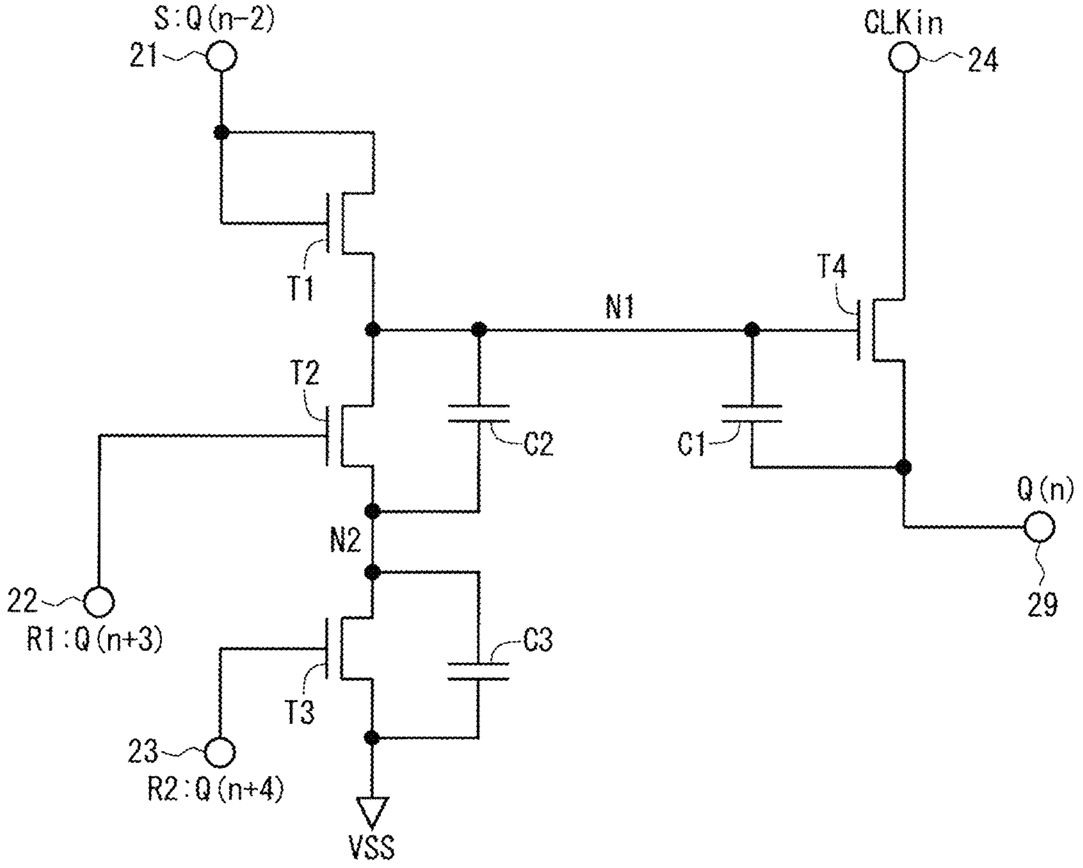
FIG. 13 is a circuit diagram illustrating a configuration of a unit circuit (configuration of one stage of a shift register) in a first specific example as the modified example.

First, a first specific example is described. When the 8-phase clock signal having a duty ratio of 1/4 is employed as the gate clock signal GCK, for example, "x=3, y=4, z=2" satisfies the above expressions (1) to (5). As illustrated in FIG. 13, in the unit circuit 2(*n*) of the nth stage, the output signal Q(n−2) output from the unit circuit 2(*n*−2) of the (n−2)th stage is supplied as the set signal S, the output signal Q(n+3) output from the unit circuit 2(*n*+3) of the (n+3)th stage is supplied as the first reset signal R1, and the output signal Q(n+4) output from the unit circuit 2(*n*+4) of the (n+4)th stage is supplied as the second reset signal R2.

Figure 14:
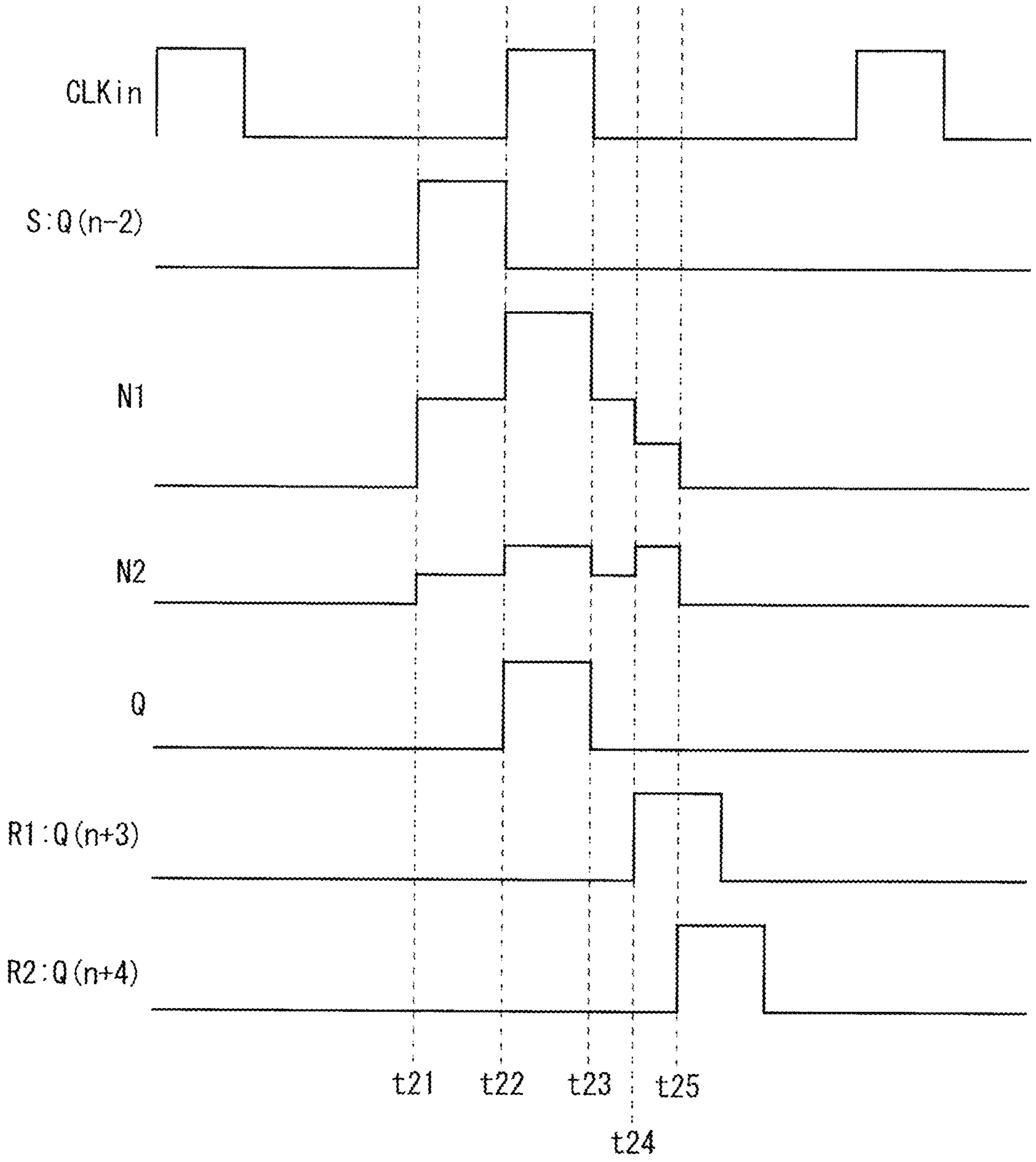
FIG. 14 is a signal waveform diagram for describing operations of the unit circuit in the first specific example as the modified example.

The operation of the unit circuit 2(*n*) of the nth stage according to the first specific example will be described with reference to FIG. 14. After the potentials of the first control node N1 and the second control node N2 decrease as the input clock signal CLKin changes from the high level to the low level at time t23, the first reset signal R1 (output signal Q(n+3)) changes from the low level to the high level at time t24, whereby the first reset transistor T2 goes into the on state. As a result, the potential of the first control node N1 and the potential of the second control node N2 become equal to each other. The second reset signal R2 (output signal Q(n+4)) changes from the low level to the high level at time t25, whereby the second reset transistor T3 goes into the on state. At this time, since the first reset transistor T2 is also in the on state, the potential of the first control node N1 and the potential of the second control node N2 decrease to the VSS potential. As described above, also in the first specific example, the unit circuit 2(*n*) operates in the same manner as in the above embodiment. Therefore, it is possible to suppress or reduce the hot carrier degradation which is a problem in the example in the related art.

Figure 15:
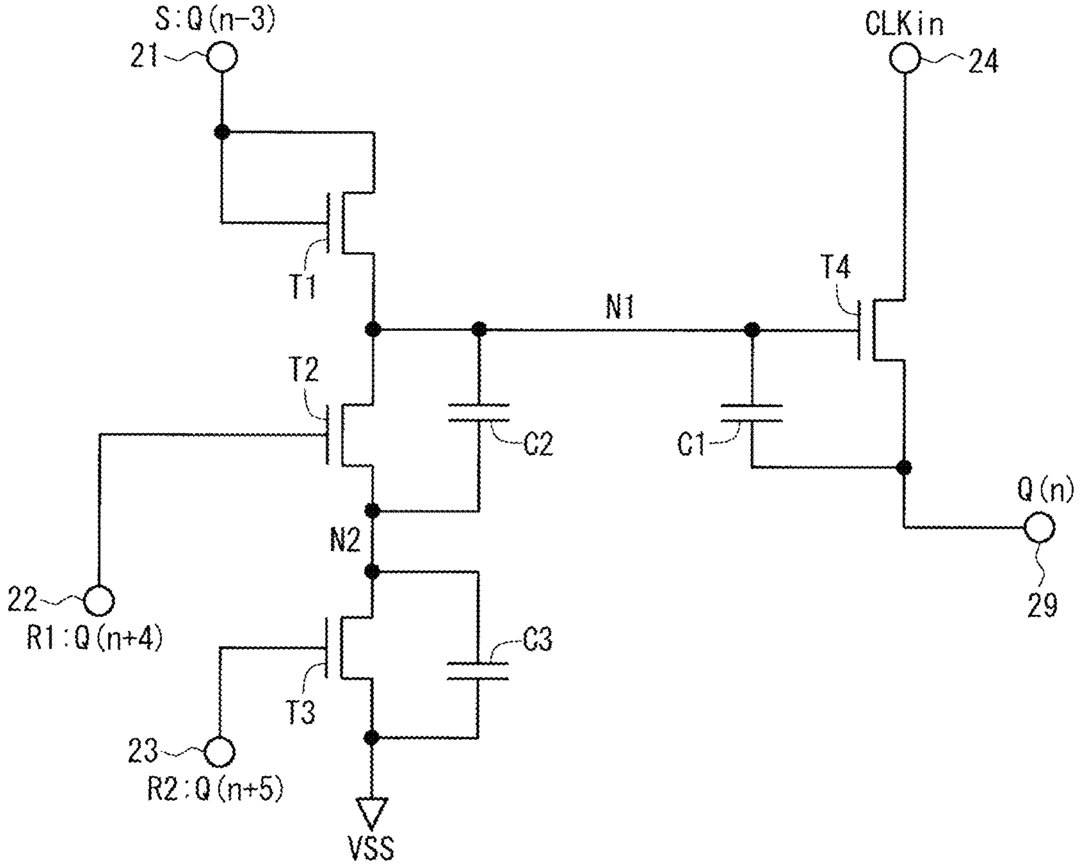
FIG. 15 is a circuit diagram illustrating a configuration of a unit circuit (configuration of one stage of a shift register) in a second specific example as the modified example.

Next, a second specific example will be described. When a six-phase clock signal having a duty ratio of 1/2 is adopted as the gate clock signal GCK, for example, "x=4, y=5, z=3" satisfies the above expressions (1) to (5). At this time, as illustrated in FIG. 15, in the unit circuit 2(*n*) of the nth stage, the output signal Q(n−3) output from the unit circuit 2(*n*−3) of the (n−3)th stage is supplied as the set signal S, the output signal Q(n+4) output from the unit circuit 2(*n*+4) of the (n+4)th stage is supplied as the first reset signal R1, and the output signal Q(n+5) output from the unit circuit 2(*n*+5) of the (n+5)th stage is supplied as the second reset signal R2.

Figure 16:
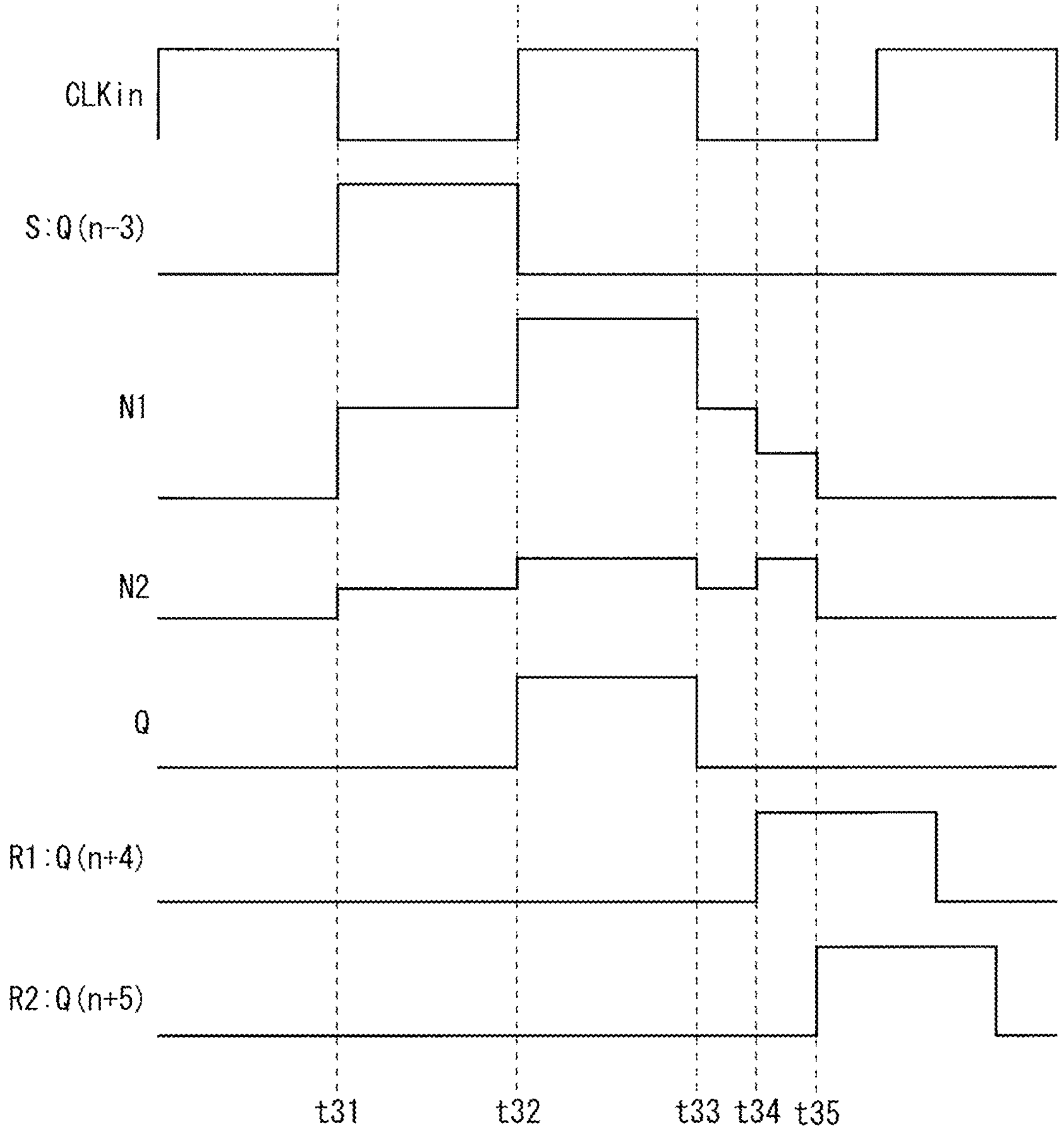
FIG. 16 is a signal waveform diagram for describing operations of the unit circuit in the second specific example as the modified example.

The operations of the unit circuit 2(*n*) of the nth stage in the second specific example will be described with reference to FIG. 16. After the potentials of the first control node N1 and the second control node N2 decrease as the input clock signal CLKin changes from the high level to the low level at time t33, the first reset signal R1 (output signal Q(n+4)) changes from the low level to the high level at time t34, whereby the first reset transistor T2 goes into the on state. As a result, the potential of the first control node N1 and the potential of the second control node N2 become equal to each other. The second reset signal R2 (output signal Q(n+5)) changes from the low level to the high level at time t35, whereby the second reset transistor T3 goes into the on state. At this time, since the first reset transistor T2 is also in the on state, the potential of the first control node N1 and the potential of the second control node N2 decrease to the VSS potential. As described above, also in the second specific example, the unit circuit 2(*n*) operates in the same manner as in the above embodiment. Therefore, it is possible to suppress or reduce the hot carrier degradation which is a problem in the example in the related art.

5. Other

Although the disclosure has been described in detail above, the above description is exemplary in all respects and is not limited thereto. It is understood that numerous other modifications or variations can be made without departing from the scope of the disclosure.

For example, the above embodiments (including the modified example) have been described taking the liquid crystal display device as an example, but the disclosure is not limited to this. The disclosure can be applied to other display devices such as an organic electro luminescence (EL) display device or an electrophoretic display device (electron paper).

Although each transistor included in the unit circuit 2 is an N-channel transistor in the above embodiments (including the modified example), a P-channel transistor may be used. Even when the P-channel transistor is used, a shift register that operates substantially in the same manner as the shift register 210 in the above embodiments can be achieved by reversing the relationship of potentials in the circuit configuration in the above embodiments.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A scanning signal line drive circuit configured to drive a plurality of scanning signal lines disposed in a display portion of a display device, the scanning signal line drive circuit comprising:

a shift register including a plurality of unit circuits constituting a plurality of stages and respectively corresponding to the plurality of scanning signal lines, the shift register operating based on a plurality of clock signals cyclically corresponding to the plurality of unit circuits, wherein each of the plurality of unit circuits includes a first control node, a second control node, an output node connected to a corresponding scanning signal line, an output control transistor including a control terminal connected to the first control node, a first conduction terminal to which an input clock signal, which is one of the plurality of clock signals, is supplied, and a second conduction terminal connected to the output node, a set transistor including a control terminal to which a set signal is supplied, the set signal being an output signal output from a unit circuit of a z-th stage before a current stage, where z is a natural number, a first conduction terminal to which the set signal or an on level potential is supplied, and a second conduction terminal connected to the first control node, a first reset transistor including a control terminal to which a first reset signal is supplied, the first reset signal being an output signal output from a unit circuit of an x-th stage after the current stage, where x is a natural number, a first conduction terminal connected to the first control node, and a second conduction terminal connected to the second control node, a second reset transistor including a control terminal to which a second reset signal is supplied, the second reset signal being an output signal output from a unit circuit of a y-th stage after the current stage, where y is a natural number greater than the x, a first conduction terminal connected to the second control node, and a second conduction terminal to which an off level potential is supplied, a first adjustment capacitor having one end connected to the first control node and the other end connected to the second control node, and a second adjustment capacitor having one end connected to the second control node and the other end to which an off level potential is supplied, and after the first reset transistor changes from an off state to an on state based on the first reset signal to change a potential of the first control node from an on level to an off level, the second reset transistor changes from an off state to an on state based on the second reset signal before the first reset transistor changes from the on state to the off state based on the first reset signal.

2. The scanning signal line drive circuit according to claim 1, wherein a relationship between the z, a number P of phases of the plurality of clock signals, and a duty ratio D of each of the plurality of clock signals satisfies the following expression, $$z/P \leq 1-D.$$

3. The scanning signal line drive circuit according to claim 1, wherein a relationship between the x, the y, the number P of phases of the plurality of clock signals, and the duty ratio D of each of the plurality of clock signals satisfies the following four expressions, $$x/P > D$$

$$y/P < 1$$

$$y > x$$

$$(y-x)/P < D.$$

4. The scanning signal line drive circuit according to claim 1, wherein a relationship between the z, the x, the y, the number P of phases of the plurality of clock signals, and the duty ratio D of each of the plurality of clock signals satisfies the following five expressions, $$z/P \leq 1-D$$

$$x/P > D$$

$$y/P < 1$$

$$y > x$$

$$(y-x)/P < D.$$

5. The scanning signal line drive circuit according to claim 1, wherein each of the plurality of unit circuits further includes a boost capacitor having one end connected to the first control node and the other end connected to the output node.

6. The scanning signal line drive circuit according to claim 1, wherein the first reset transistor and the second reset transistor are thin film transistors.

7. The scanning signal line drive circuit according to claim 6, wherein the first reset transistor and the second reset transistor each are a thin film transistor including a channel layer formed of an oxide semiconductor.

8. A display device comprising:

a display portion in which a plurality of scanning signal lines are disposed; and the scanning signal line drive circuit according to claim 1.

* * * * *